United States Patent [19]
Gochenour

[11] Patent Number: 6,035,993
[45] Date of Patent: Mar. 14, 2000

[54] FRICTION CLUTCH WITH PRE-DAMPER

[75] Inventor: Daniel V. Gochenour, Auburn, Ind.

[73] Assignee: Eaton Corporation, Cleveland, Ohio

[21] Appl. No.: 09/258,572

[22] Filed: Feb. 26, 1999

[51] Int. Cl.[7] ....................................................... F16D 3/14
[52] U.S. Cl. .......................... 192/205; 192/213.1; 464/63
[58] Field of Search ................................ 192/205, 213.1, 192/213.11, 213.12; 464/63, 68

[56] References Cited

U.S. PATENT DOCUMENTS

| | | | |
|---|---|---|---|
| 1,279,999 | 9/1918 | Eaton | 464/63 X |
| 3,414,101 | 12/1968 | Binder et al. | 464/63 X |
| 4,645,054 | 2/1987 | Raab | 192/213.1 X |
| 5,195,622 | 3/1993 | Tauvron et al. | 192/212 X |
| 5,657,845 | 8/1997 | Szadkowski et al. | |

FOREIGN PATENT DOCUMENTS 2 183 790   6/1987   United Kingdom .

*Primary Examiner*—Rodney H. Bonck
*Attorney, Agent, or Firm*—Dykema Gossett PLLC

[57] ABSTRACT

A clutch driven disc assembly includes an inner hub, an outer hub, an annular predamper driving element, an plurality of predamper springs, a plurality of spring caps, an annular spring plate, an annular disc assembly and a plurality of drive springs. The annular predamper driving element is rotatably fixed to the outer hub and has a planar base portion. The annular predamping driving element also has a plurality of axially extending spring retention arms and a plurality of spring engagement driving portions. The spring engagement driving portions are disposed radially inwardly of the spring retention arms. The spring retention arms define a plurality of first spring gaps in radial alignment with the spring retention arms. The annular predamper driven element is rotatably fixed to the inner hub and has an annular shoulder. The annular predamper driven element also has a plurality of axially extending spring engagement driven portions defining a plurality of second spring gaps. The second spring gaps are in radial alignment with the first spring gaps in a neutral condition. The predamper springs are disposed in the first and second spring gaps. The predamper springs are compressed with relative rotation between the predamper driving element and the predamper driven element. The annular spring plate is rotatably fixed to the outer hub. The annular disc assembly has a friction element fixed thereto. The disc assembly is mounted for relative rotation to the spring plate by a predetermined amount. The drive springs are operably disposed between the spring plate and the disc assembly.

7 Claims, 3 Drawing Sheets

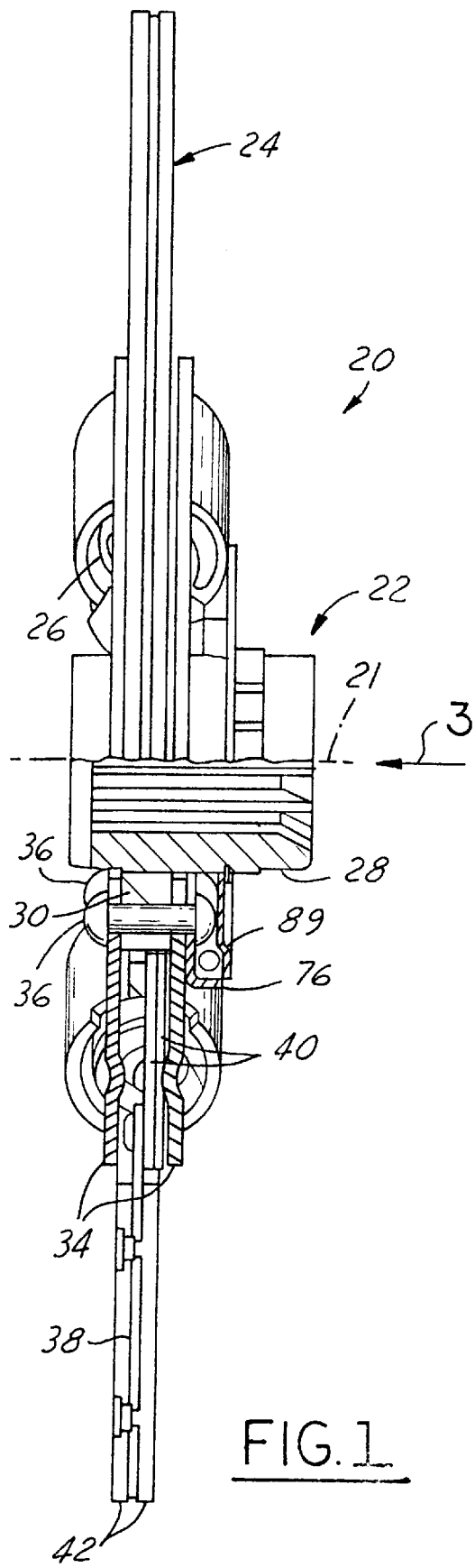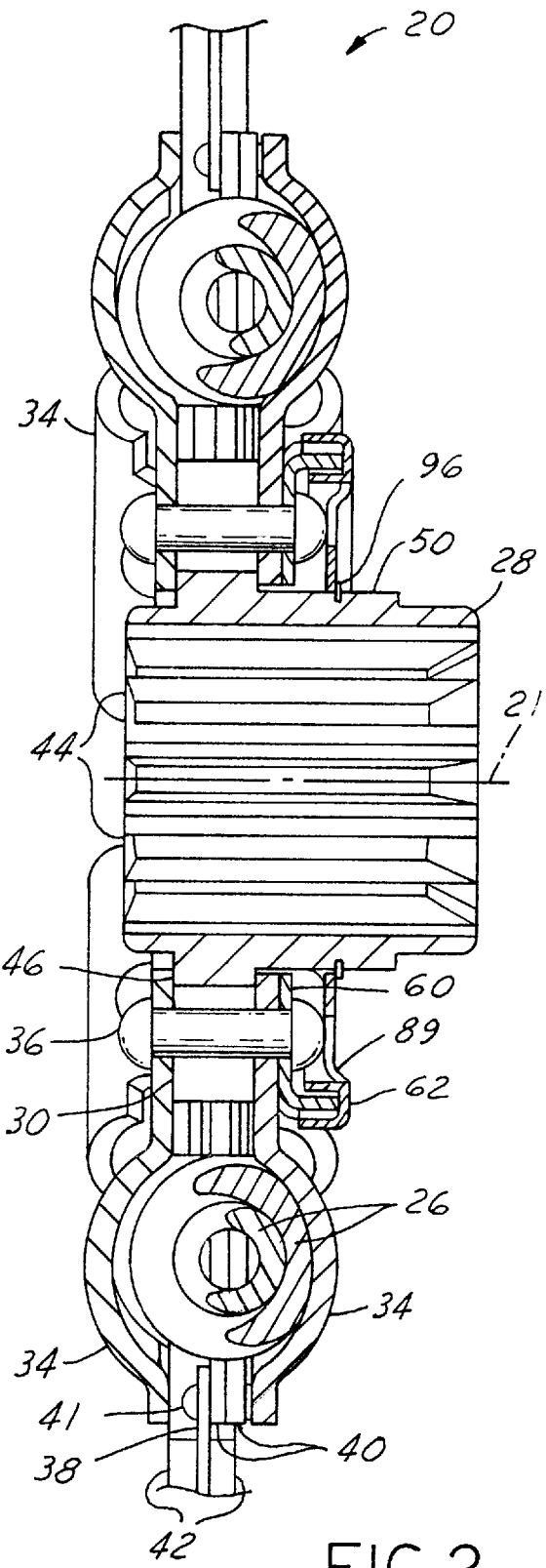
FIG. 1
FIG. 2

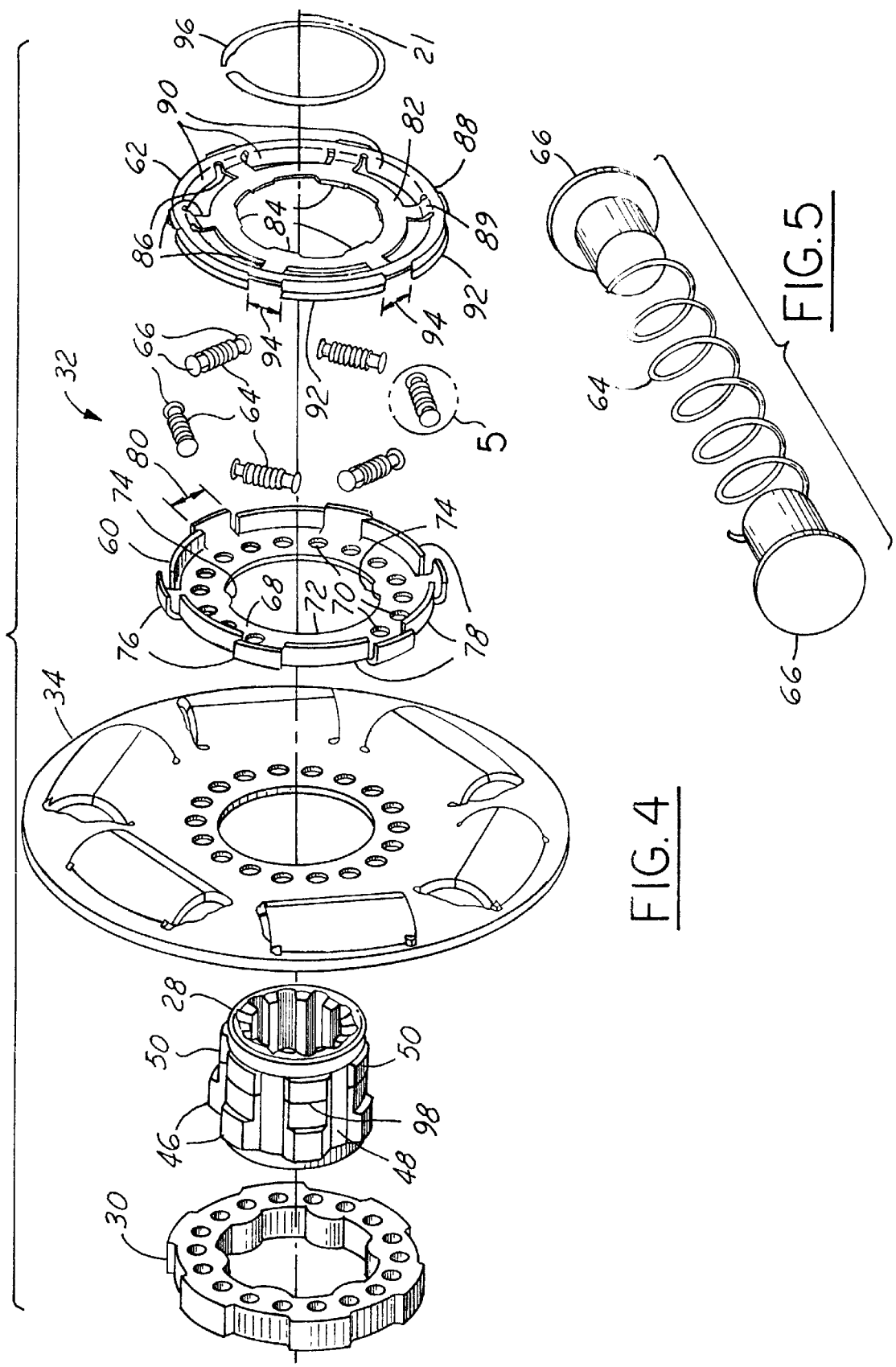

FRICTION CLUTCH WITH PRE-DAMPER

FIELD OF THE INVENTION

This invention relates in general to friction clutches and in particular to predampers for clutch driven discs.

BACKGROUND OF THE INVENTION

Clutches are well known devices used to selectively connect a source of rotational power, such as the crankshaft of an internal combustion engine and its flywheel, to a driven mechanism, such as a transmission. When the engine is connected with the transmission by the clutch, vibrations are transmitted through the clutch and into the transmission and other drive train components, producing undesirable noise conditions such as gear rattle.

Clutches have long employed a plurality of compression damping springs between a clutch hub engaged with a transmission input shaft and a clutch disc engaged with the engine flywheel. These springs are typically disposed in spring pockets circumferentially located around the clutch hub. Compression of the damping springs is limited by stops disposed between the hub and the disc limiting relative rotation therebetween. The damping springs provide some isolation between the engine and transmission of firing pulses of the engine and other engine speed fluctuations. However, vibrations can still be transmitted through the damping springs to produce gear rattle.

One solution has been to split the hub into an inner hub directly connected to the transmission input shaft and an outer hub connected to the clutch disc through the damping springs. The inner hub and outer hub are configured to provide a predetermined amount of rotative lash between the two parts. A predamper is placed between the inner hub and the outer hub. The predamper has springs of particular rates and preload characteristics selected to damp out vibrations which can induce gear rattle.

Predampers typically comprise driving and driven elements, the driven element being rotatably fixed to the inner hub and the driving element being rotatably fixed to the outer hub, with a plurality of compression predamper springs disposed therebetween. The predamper springs are much smaller than, and of a much lower spring rate than, the damping springs.

Known predampers trap the predamper springs with features formed which are predamper driving and driven elements. The spring entrapment features are typically formed with tools configured to make the entrapment features of a particular size. Such features include localized concave spring retention pockets. Concave pockets of the driving and driven elements and other features unique to the size of the springs must be changed when springs of different size are employed. Varying the size of the features, as might be done to vary the rate or preload of the predamper springs, requires the forming of an entirely new tool. This is undesirable, as tools are quite expensive. It is therefore desired to provide a predamper design which easily accommodates the revision of the spring openings without requiring the fabrication of a new tool.

SUMMARY OF THE INVENTION

A clutch driven disc assembly includes an inner hub, an outer hub, an annular predamper driving element, an plurality of predamper springs, an annular spring plate, an annular disc assembly and a plurality of drive springs. The inner hub has an axis of rotation as well as external teeth defining circumferential gaps therebetween. The outer hub is disposed over the inner hub and has internal teeth disposed in the circumferential gaps between the external teeth of the inner hub. The internal teeth of the outer hub are smaller than the circumferential, gaps, enabling a predetermined amount of relative rotation between the inner hub and the outer hub. The annular predamper driving element is rotatably fixed to the outer hub and has a planar base portion. The annular predamping driving element also has a plurality of axially extending spring retention arms and a plurality of spring engagement driving portions. The spring engagement driving portions are disposed radially inwardly of the spring retention arms. The spring retention arms define a plurality of first spring gaps in radial alignment with the spring retention arms. The annular predamper driven element is rotatably fixed to the inner hub and has an annular shoulder. The annular predamper driven element also has a plurality of axially extending spring engagement driven portions defining a plurality of second spring gaps. The second spring gaps are in radial alignment with the first spring gaps in a neutral condition. The predamper springs are disposed in the first and second spring gaps. The predamper springs are compressed with relative rotation between the predamper driving element and the predamper driven element. The annular spring plate is rotatably fixed to the outer hub. The annular disc assembly has a friction element fixed thereto. The disc assembly is mounted for relative rotation to the spring plate by a predetermined amount. The drive springs are operably disposed between the spring plate and the disc assembly.

BRIEF DESCRIPTION OF THE DRAWINGS

FIG. 1 is a side view, partially sectioned in the direction of arrows 1, of the clutch of FIG. 3.

FIG. 2 is an enlarged sectional side view of a radially inwardly disposed hub assembly viewed in the direction of arrows 2 of FIG. 3.

FIG. 4 is an exploded perspective view of selected elements of the hub portion.

FIG. 5 is an enlarged perspective view of the spring and end caps of FIG. 4 shown in circle 5.

DESCRIPTION OF PREFERRED EMBODIMENTS

Figure 3:
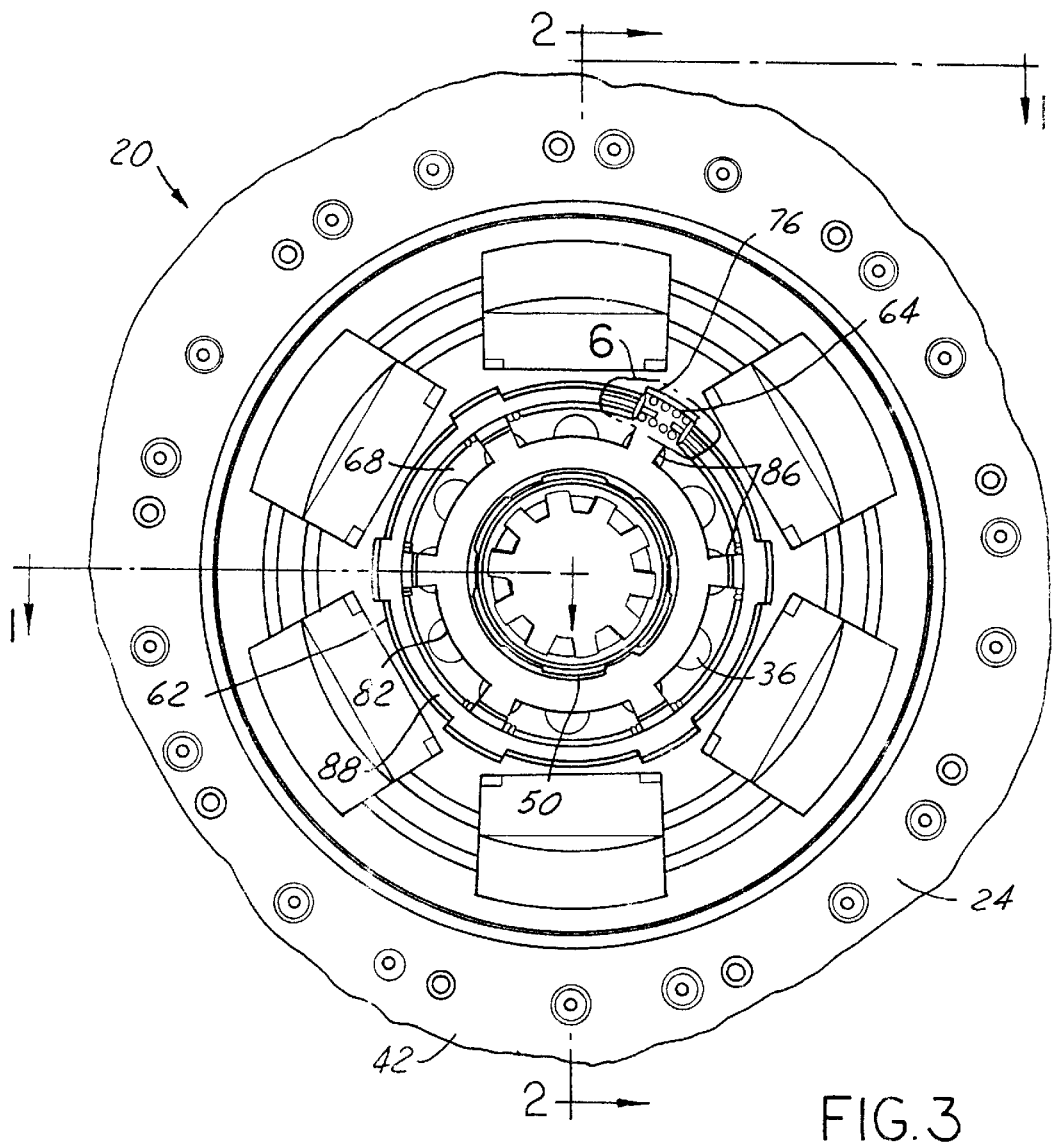
FIG. 3 is an end view of a hub portion of the driven disc assembly of FIG. 1 in the direction of arrow 3.

A clutch driven disc assembly 20 as shown in FIG. 1 includes an axis of rotation 21, a hub assembly 22, a disc assembly 24 and a plurality of damping or drive springs 26 disposed between hub assembly 22 and disc assembly 24.

Hub assembly 22, best shown in FIGS. 2 and 4 includes an inner hub 28 and an outer hub 30. A predamper 32 is disposed between inner hub 28 and outer hub 30. A pair of spring plates 34 are fixed to an outer hub 30 by rivets 36.

Disc assembly 24 includes an annular disc 38 which is attached to a pair of annular overlapped stack plates 40 by rivets 41. Stack plates 40 are disposed radially inwardly of disc 38. Facing material 42 is placed on each side of disc 38 for frictional engagement with a clutch flywheel (not shown) and a clutch pressure plate (not shown) when installed in a vehicle. Stack plates 40 are axially disposed between spring plates 34. Drive springs 26 are disposed in spring pockets in both stack plates 40 and spring plates 34. Relative rotation of disc assembly 24 to hub assembly 22 compresses drive springs 26.

Inner hub 28 has a plurality of inner hub splines 44 for slidable engagement with splines on a transmission input shaft (not shown). Inner hub 28 also has six external teeth 46 extending radially outwardly from hub 28. Teeth 46 are evenly circumferentially spaced around hub 28 and define circumferential gaps 48 therebetween. A first end of teeth 46 are of a reduced height, forming tooth flats 50 of a predetermined diameter enabling axial receipt of predamper 32. Outer hub 30 has six internal teeth 52 received by gaps 48. Teeth 52 are circumferentially smaller than gaps 48. The difference in size between teeth 52 and gaps 48 results in rotary lash between inner and outer hubs 28 and 30. In one preferred embodiment the rotary lash is equal to ±3° without predamper 32 being installed.

Rivets 36 also affix an annularly shaped predamper driving element 60 to spring plates 34 and outer hub 30, as well as attaching spring plates 34 to outer hub 30. Predamper 32, in addition to driving elements 60, includes a driven element 62 rotatably connected to driving element 60 by a plurality of predamper springs 64. Each of springs 64 has a predamper spring end cap 66 disposed in the end thereof.

Predamper driving element 60 includes an annular and planar base portion 68 having a plurality of rivet apertures 70. Rivet apertures 70 in base portion 68 receive rivets 36. A central hub aperture 72 is of approximately the same size as a corresponding aperture in spring plates 34. Aperture 72 is sized to slip over tooth flats 50 but not pass over teeth 46. A pair of radially inwardly extending positioning teeth 74 are disposed 180° apart on hub aperture 72. Six axially extending spring retention arms 76 extend away from spring plates 34 at a radially outermost location on driving element 60. Six arcuately shaped spring engagement driving portions 78 extend axially from base portion 60 at a location radially inwardly of spring retention arms 76. Spring engagement driving portions 78 define six first spring gaps 80 radially aligned with arms 76. Radially aligned means gaps 80 are, relative to axis 21, angularly aligned with arms 76.

Figure 6:
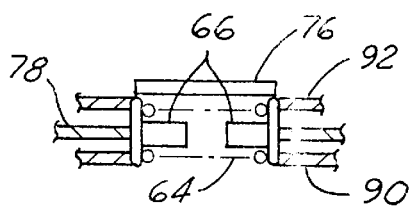
FIG. 6 is a schematic view of a predamper and a predamper spring in a neutral condition.
Figure 7:
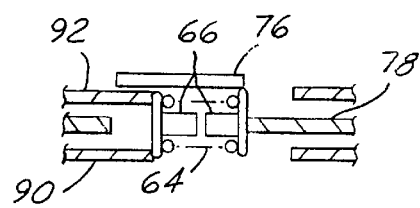
FIG. 7 is a schematic view of the predamper of FIG. 6 in a first torsionally deflected condition.

Predamper driven element 62 includes a planar inner annular base portion 82 with six inwardly radially extending internal teeth 84. Internal teeth 84 are approximately equal in size to the gaps between tooth flats 50, and prevent rotation of driven element 62 relative to inner hub 28. Six radial spoke portions 86 extend radially outwardly from inner base portion 82 to a planar annular outer base portion 88. Inner base portion 82 is parallel to and axially offset from outer base portion 88 by a predetermined distance. Both base portions 82 and 88 are centered on axis 21. Each of spokes 86 has a step 89 proximate to outer base portion 88 which accommodates the offset. Axially extending from outer base portion 88 are six spring outer engagement driven portions 90 and six spring inner engagement driven portions 92. Inner and outer engagement driven portions 90 and 92 are radially spaced from each other. Outer engagement driven portions 92 are evenly spaced about axis 21, defining six second spring gaps 94. Inner engagement driven portions 90 are radially aligned with the outer portions 92. Inner engagement driven portions 90 define a radially inwardly disposed portion of second spring gaps 94. Second spring gaps 94 are radially aligned with spoke portions 86. Second spring gaps 94, in one preferred embodiment best shown in FIGS. 6 and 7, are substantially equal to first spring gap 80, resulting in simultaneous contact of both caps 66 in each spring 64 with driven portions 90 and 92 and with driving portions 78. However, it should be appreciated that first and second spring gaps 80 and 94 could be of consistently different lengths to provide a limited range of rotation with no predamper resistance to relative rotation between inner hub 28 and outer hub 30. Yet alternatively some of the pairs of first and second gaps would be of the same length, while other pairs would be of differing lengths to produce multiple stage damping.

Positioning teeth 74 of driving element 60 ensure that driving element 60 is riveted to spring plate 34 and outer hub 30 in an orientation that will permit assembly of driven element 62 to driving element 60. Such assembly cannot be completed until internal teeth 84 are in alignment with teeth 52 of hub 30 and gaps 94 are aligned with gaps 80. If driving element 60 is not correctly indexed relative to outer hub 30, then driven element 62 will either have its internal teeth 84 misaligned with the internal teeth 52 of outer hub 30, preventing receipt of inner hub 28 or will have first spring gap 80 out of alignment with second spring gap 94, preventing assembly of predamper 32.

A snap ring 96 disposed in snap ring groove 98 axially retains predamper 32, and in particular, predamper driven element 62 on inner hub 28.

End caps 66 advantageously facilitate the retention of springs 64 within predamper 32, and help prevent distortion of springs 64 when springs 64 are being compressed due to relative rotation between driving element 60 and driven element 62. Springs 64 are compression coil springs. End caps 66 have a constant diameter shank portion sized to fit within springs 64, and a cap portion having an outer diameter about equal to an outside diameter of springs 64.

The length of the shank portion of caps 32 in the exemplary embodiment is about one third the length of spring 64 when spring 64 is installed in predamper 32 and is in an unloaded condition. Caps 32 do not contact each other even when the predamper is fully displaced to the maximum permitted by the maximum available relative rotation between inner hub 28 and outer hub 30. The provision of retention arms 76 on driving element 60 advantageously traps springs 64 against the aligned steps 89 of driven element 62. There is no need to rely on structures other than driving and driven elements 60 and 62 to radially trap springs 64. Further, providing spring retention arm 76 as an axial extension from driving element 60 contributes to designs for both the driving element 60 and driven element 62 for which tooling can be easily revised to change the first and second spring gaps 80 and 94. The gaps 80 and 94 can be changed by merely altering the width of the blanking tool at the location of spring gaps 80 and 94. There is no need to revise the forming tools which bend the driving and driven elements 60 and 62 to their final shape. Such flexibility is particularly advantageous in that it allows the selection of predamper springs 64 of different lengths. It may be desired to change the length of gaps 80 and 94 to accommodate springs of different preloads, or different spring rates. Elimination of the need to revise the stamping tool enables the rapid change over of tooling from a first spring length to a second spring length as required for a particular clutch therefore constitutes a significant benefit. Forming the inner and outer base portions 82 and 88 to be planar contributes to the changing spring sizes. Also contributing to the ease of changing spring sizes is the planar configuration of base portion 68.

The embodiments disclosed herein have been discussed with the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

I claim:

1. A clutch driven disc assembly comprising:

an inner hub having an axis of rotation and having external teeth defining circumferential gaps therebetween;

an outer hub disposed over the inner hub and having internal teeth disposed in the circumferential gaps between the external teeth of the inner hub and the internal teeth of the outer hub being smaller than the circumferential gaps enabling a predetermined amount of relative rotation between the inner hub and the outer hub;

an annular spring plate rotatably fixed to the outer hub;

an annular disc assembly having a friction element fixed thereto, the disc assembly being mounted for rotation relative to the spring plate by a predetermined amount;

a plurality of drive springs operably disposed between the spring plate and the disc assembly;

an annular predamper driving element rotatably fixed to the outer hub and having a planar base portion and having a plurality of axially extending spring retention arms and having a plurality of axially extending spring engagement driving portions disposed radially inwardly of the spring retention arms and the spring retention arms defining a plurality of first spring gaps in radial alignment with the spring retention arms;

an annular predamper driven element rotatably fixed to the inner hub and having an annular shoulder and having a plurality of axially extending spring engagement driven portions defining a plurality of second spring gaps in radial alignment with the first spring gaps in a neutral condition; and a plurality of predamper springs disposed in the first and second spring gaps wherein the predamper springs are compressed with relative rotation between the predamper driving element and the predamper driven element.

2. A clutch driven disc assembly as claimed in claim 1 wherein the predamper driving element is planar except for the retention arms and the engagement portions.

3. A clutch driven disc assembly as claimed in claim 1 wherein the predamper driven element includes a substantially planar inner base portion at a first axial location and a substantially planar outer base portion parallel to and concentric with inner base portion at a second axial location axially offset from the first axial location and having a plurality of spokes connecting the base portions, and the spokes each having a step accommodating a difference between the first and second axial locations, and the inner base portion being more proximate to the driving element base portion than the outer base portion is proximate to the driving element base portion, and the steps and the retention arms cooperatively radially retaining the predamper springs.

4. A clutch driven disc assembly as claimed in claim 1 wherein a spring cap is disposed in each end of each predamper spring, and each spring cap has a first end with a shank portion sized to fit within and disposed within an inner diameter of the predamper spring, and each spring cap has a second end having a cap portion sized larger than the inner diameter of the predamper springs in engagement with an end of the predamper springs and disposed within the first and second spring gaps.

5. A clutch driven disc assembly comprising:

an inner hub have an axis of rotation and having external teeth defining circumferential gaps therebetween;

an outer hub disposed over the inner hub and having internal teeth disposed in the circumferential gaps between the external teeth of the inner hub and the internal teeth of the outer hub being smaller than the circumferential gaps enabling a predetermined amount of relative rotation between the inner hub and the outer hub;

an annular spring plate rotatably fixed to the outer hub;

an annular disc assembly having a friction element fixed thereto, the disc assembly being mounted for rotation relative to the spring plate by a predetermined amount;

a plurality of drive springs operably disposed between the spring plate and the disc assembly;

an annular predamper driving element rotatably fixed to the outer hub and having a planar base portion and having a plurality of axially extending spring retention arms and having a plurality of axially extending spring engagement driving portions disposed radially inwardly of the spring retention arms and the spring retention arms defining a plurality of spring gaps in radial alignment with the spring retention arms;

an annular predamper driven element rotatably fixed to the inner hub and having an annular shoulder and having a plurality of axially extending spring engagement driven portions defining a plurality of second spring gaps with at least one of the second spring gaps being of a length different from that of the corresponding first spring gap and being in radial alignment with the first spring gap in a neutral condition; and a plurality of predamper springs disposed in the first and second spring gaps wherein the predamper springs are compressed with relative rotation between the predamper driving element and the predamper driven element.

6. A clutch driven disc assembly as claimed in claim 5 wherein the predamper driving element is planar except for the retention arms and the engagement portions.

7. A clutch driven disc assembly as claimed in claim 5 wherein the predamper driven element includes a substantially planar inner base portion at a first axial location and a substantially planar outer base portion parallel to and concentric with inner base portion at a second axial location axially offset from the first axial location and having a plurality of spokes connecting the base portions, and the spokes each having a step accommodating a difference between the first and second axial locations, and the inner base portion being more proximate to the driving element base portion than the outer base portion is proximate to the driving element base portion, and the steps and the retention arms cooperatively radially retaining the predamper springs.

* * * * *